Jan. 4, 1927. 1,613,353

R. KROEDEL

FOCUSING MECHANISM FOR PHOTOGRAPHIC CAMERAS

Filed July 13, 1925

Robert Kroedel,
INVENTOR.

BY R. L. Stinchfield
Donald H. Stewart
ATTORNEYS.

Patented Jan. 4, 1927.

1,613,353

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FOCUSING MECHANISM FOR PHOTOGRAPHIC CAMERAS.

Application filed July 13, 1925. Serial No. 43,304.

This invention relates to photography and more particularly to photographic cameras. One object of the invention is to provide an improved focusing mechanism by which the camera objective may be moved to and from the focal plane of the camera. Another object of my invention is to provide a simple focusing device which will hold the camera parts in an adjusted position. Another object is to provide a focusing mechanism which may be easily adjusted so as to care for objectives of different focal lengths. Other objects will appear from the following specification, the novel features being pointed out in the claim at the end thereof.

In the drawings wherein like reference characters denote like parts throughout;

Figure 1:
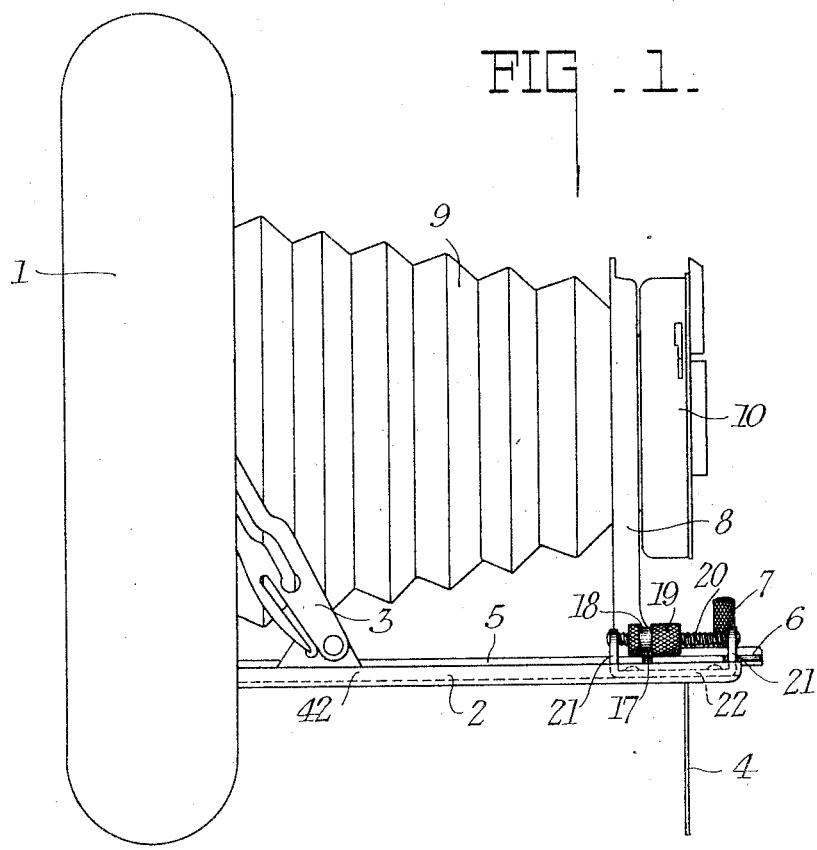
Fig. 1 is a side elevation of a camera having focusing mechanism constructed in accordance with and embodying one form of my invention.

By way of illustration, I have shown my focusing mechanism as being used on a well known type of compact folding roll film camera. This camera broadly comprises a body portion 1 to which there is hinged the usual bed 2 which is supported in an open portion by means of bed braces 3. There is a molding leg 4 for supporting the camera upon a flat surface. On the relatively fixed bed 2, there is mounted a movable plate 5 which is adapted to form a runway or track for the lens carriage 6 which is operated through the finger grips 7. This lens carriage carries a yoke 8 which supports the front end 9 of the camera bellows and the camera shutter 10 which carries the objective.

The edges of the plate 5 are formed upwardly at 25 to provide rails which are engaged by the lens carriage. The plate 5 also carries a plurality of slots 6 (only one being shown) through which studs 15 carried by the bed 2 pass. This plate may, therefore, be moved upon these studs by the following mechanism.

A bracket 17 is affixed to the movable plate 5 and this bracket extends into a slot 18 cut in the nut 19. This nut is preferably roughened or serrated as shown at 29, so as to form a grip by which it may be turned. The nut 19 is carried upon a threaded member 20 which is fixedly attached to the upstanding ends 21 over a bracket 22. Obviously when the nut 19 is turned upon the screw 20 it carries with it the bracket 17 and the plate 5, so that the camera objective may be focused.

Figure 2:
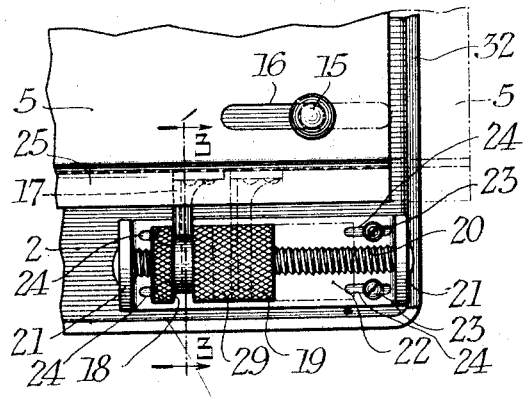
Fig. 2 is a fragmentary plan view on an enlarged scale of the focusing mechanism shown in Fig. 1
Figure 3:
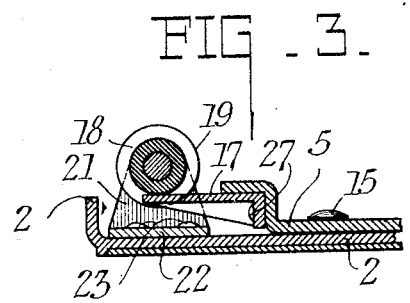
Fig. 3 is a section on line 3—3 of Fig. 2.

In order to care for objectives of slightly different focal length, such as are met with in ordinary manufacturing conditions, the bracket 22 is provided with a plurality of slots 24 through which screws 23 pass into the camera bed 2. It is, therefore, a simple matter to adjust the bracket to care for the focal length lens being used on the camera. The camera bed 2 is provided with a flange 42 on the sides, but this flange is cut away as is shown at 32 on the end of the bed, so that the plate 5 with its associated parts may slide out beyond the end of the bed as is indicated in dot and dash lines in Figure 2.

The operation of a camera equipped with my improved focusing device is as follows: The camera bed 2 is opened and the camera front is drawn out by means of the finger grips 7 until the carriage comes to a stop in the usual manner. This locks the lens carriage to the movable plate 5. It is common practice to place the stop in such a position that when the lens carriage is drawn out the objective is focused on infinity. To focus the camera for nearer objects, the operator merely turns the nut 19 by the knurling 29, so that the nut will move upon the threaded member 20 thus moving with the bracket 17 and plate 5, which moves freely upon the studs 15. As it is not possible to move the nut through the bracket, the camera will remain in any set or adjusted position, until the operator again moves the nut.

While I have shown my invention applied to a compact type of roll film camera, it is equally useful for any type of camera, wherein a movable member must be adjusted relatively to a fixed member for focusing the camera objective.

Having thus described my invention, what I claim as new and desire to secure by Letters Patent is:

In a photographic camera including an objective, the combination with a bed, of a movably mounted plate carried by the bed, rails supported by the movably mounted plate adapted to support a lens carriage, means for moving the plate relative to the bed including a threaded member having a slot therein, a fixed screw mounted on one relatively movable part and a bracket on the other movable part adapted to engage the slot in the movable nut, whereby the camera may be focused by turning the nut on the screw moving the plate through the bracket.

Signed at Rochester, New York, this 9th day of July, 1925.

ROBERT KROEDEL.